US007817966B2

(12) United States Patent
Prikhodko et al.

(10) Patent No.: US 7,817,966 B2
(45) **Date of Patent: *Oct. 19, 2010**

(54) SWITCHING DEVICE WITH REDUCED INTERMODULATION DISTORTION

(75) Inventors: Dima Prikhodko, Woburn, MA (US); Sergey Nabokin, Pelham, NH (US); Oleksey Klimashov, Burlington, MA (US); Steven C. Sprinkle, Hampstead, NH (US); Gene A. Tkachenko, Belmont, MA (US); Richard A. Carter, Hampton, NH (US)

(73) Assignee: Skyworks Solutions, Inc., Woburn, MA (US)

(*) Notice: Subject to any disclaimer, the term of this patent is extended or adjusted under 35 U.S.C. 154(b) by 656 days.

This patent is subject to a terminal disclaimer.

(21) Appl. No.: 11/827,847

(22) Filed: Jul. 13, 2007

(65) Prior Publication Data

US 2009/0015508 A1 Jan. 15, 2009

(51) Int. Cl.
*H04B 1/44* (2006.01)

(52) U.S. Cl. ........................ 455/78; 455/83; 455/277.1; 455/278.1; 455/319

(58) Field of Classification Search ................... 455/78, 455/83, 277.1, 278.1, 319
See application file for complete search history.

(56) References Cited

U.S. PATENT DOCUMENTS

| | | | |
|---|---|---|---|
| 5,095,285 | A | 3/1992 | Khatibzadeh |
| 5,528,196 | A | 6/1996 | Baskin et al. |
| 5,644,268 | A | 7/1997 | Hang |
| 5,969,582 | A | 10/1999 | Boesch et al. |
| 6,163,713 | A | 12/2000 | Suzuki et al. |
| 6,560,443 | B1 | 5/2003 | Vaisanen et al. |
| 6,642,578 | B1 | 11/2003 | Arnold et al. |
| 6,803,680 | B2 | 10/2004 | Brindle et al. |
| 6,804,502 | B2 | 10/2004 | Burgener et al. |

(Continued)

FOREIGN PATENT DOCUMENTS

| | | |
|---|---|---|
| JP | 1997-083259 A | 3/1997 |

OTHER PUBLICATIONS

"Digital Cellular Telecommunications System (Phase 2+)", Radio Transmission and Reception, 3GPP TS 05.05 version 8.6.0 Release 1999, pp. 1-95.

(Continued)

*Primary Examiner*—Sanh D Phu
(74) *Attorney, Agent, or Firm*—Lando & Anastasi, LLP

(57) ABSTRACT

According to one exemplary embodiment, a switching device with phase selection terminals to select between at least two phase shifting modes to reduce intermodulation distortion in the switching device includes a first phase selection terminal to select a first phase shifting mode of the switching device by enabling a first phase shifter in a first phase shifting switching branch coupled to an input of the switching device. The switching device further includes a second phase selection terminal to select a second phase shifting mode of the switching device by enabling a second phase shifting switching branch coupled to the switching device input. The intermodulation distortion in the switching device is reduced by selecting one of the first and second phase shifting modes. The switching device may further include a number of FETs coupled in series between an output of the switching device and the first and second phase shifting switching branches.

20 Claims, 4 Drawing Sheets

U.S. PATENT DOCUMENTS

| | | | |
|---|---|---|---|
| 6,829,471 B2 | 12/2004 | White et al. | |
| 6,835,968 B2 | 12/2004 | Kitazawa et al. | |
| 6,876,258 B2 | 4/2005 | Ohta et al. | |
| 6,917,259 B2 | 7/2005 | Hirabayashi | |
| 7,076,216 B2 | 7/2006 | Hiyashi | |
| 7,088,971 B2 | 8/2006 | Burgener et al. | |
| 7,098,755 B2 | 8/2006 | Zhao et al. | |
| 7,098,759 B2 | 8/2006 | Chang | |
| 7,180,758 B2 | 2/2007 | Lincoln et al. | |
| 7,199,635 B2 | 4/2007 | Nakatsuka et al. | |
| 7,202,736 B1 | 4/2007 | White et al. | |
| 7,206,551 B2 | 4/2007 | Itakura et al. | |
| 7,239,853 B2 | 7/2007 | Kearns | |
| 7,259,643 B2 | 8/2007 | Son et al. | |
| 7,391,283 B2 | 6/2008 | Kearns | |
| 7,417,515 B2 | 8/2008 | Chominski | |
| 7,418,251 B2 | 8/2008 | Liu | |
| 7,459,988 B1 | 12/2008 | Iversen | |
| 7,479,844 B2 | 1/2009 | Kormanyos | |
| 7,492,209 B2 | 2/2009 | Prikhodko et al. | |
| 2005/0012400 A1 | 1/2005 | Gresham | |
| 2005/0282503 A1 | 12/2005 | Onno et al. | |
| 2006/0051038 A1 | 3/2006 | Imai et al. | |
| 2006/0252394 A1* | 11/2006 | Suwa et al. | 455/201 |
| 2008/0079513 A1 | 4/2008 | Prikhodko et al. | |
| 2008/0079514 A1 | 4/2008 | Prikhodko et al. | |
| 2008/0079653 A1* | 4/2008 | Ahn et al. | 343/904 |
| 2008/0129642 A1* | 6/2008 | Ahn et al. | 343/876 |
| 2008/0180189 A1 | 7/2008 | Miya | |
| 2008/0247338 A1* | 10/2008 | Kim et al. | 370/280 |

OTHER PUBLICATIONS

"GaAs Ap6T 2.5 V High Power Switch Dual/Tri/Quad-Band GSM Applications" M/A-com Inc.

Gotch et al., "State-of-the-Art Low Loss, High Isolation SP6T Switch for Handset Applications", European Conference on Wireless Technology, 17-20 (2004).

Holm et al., "Charge Effects and Transient Simulation of p-HEMT Meander Gate Switches" EuMA, Sep. 2006, pp. 367-370.

Kohama et al., "High Power DPDT Antenna Switch MMIC for Digital Cellular System", IEEE Journal of Solid State Circuits, vol. 31, No. 10, Oct. 1996, pp. 1406-1411.

Masuda et al., "High Power Heterojunction GaAs Switch IC with P-1dB of more than 38dBm for GSM Application", IEEE, 1998, pp. 229-232.

Shifin et al., "Monolithic FET Structures for High-Power Control Component Applications", IEEE Transactions on Microwave Theory and Techniques, vol. 37, No. 12, Dec. 1989, pp. 2134-2141.

"SP6T GaAs Multi-Band GSM Antenna Switch", Filtronic, Preliminary Data Sheet, v 2.1 pp. 1-5.

Yasuda, et al., An Ultra-Low Distortion 3P2T Antenna Switch MMIC for Dual-band W-CDMA Applications, IEEE, 2005, pp. 445-458.

* cited by examiner

SWITCHING DEVICE WITH REDUCED INTERMODULATION DISTORTION

BACKGROUND OF THE INVENTION

1. Field of the Invention

The present invention is generally in the field of electrical circuits. More specifically, the invention is in the field of high-frequency switching circuits.

2. Related Art

High-frequency switching devices, such as high-frequency switching devices having multiple inputs and a shared output, can be used in mobile communication devices, such as cellular handsets, to provide operation at more than one frequency. For example, a high-frequency switching device can be used in a cellular handset operating in a system using a Global System for Mobile Communications (GSM) communications standard to enable the cellular handset to operate either at a low band frequency of 900.0 MHz or a high band frequency of 1800.0 MHz by selectively coupling a corresponding input to the shared output. For high-frequency switching devices, such as high-frequency switching devices used in mobile communication devices, there is a continuing need to reduce intermodulation distortion (IMD).

A conventional high-frequency switching device can include two or more switching arms, where each switching arm can include a number of field effect transistors (FETs) coupled between an input and a shared output of the switch. Each switching arm can be coupled to a control voltage input, which can provide a high voltage to enable the switching arm and a low voltage to disable the switching arm. In one approach, IMD can be reduced by increasing the number of FETs in each switching arm. However, increasing the number of FETs in each switching arm undesirably increases the semiconductor die area consumed by the switching device and signal loss in the switching device. In another approach, IMD distortion can be reduced by utilizing a charge pump to increase the high voltage that is utilized to enable the switching arms. However, this approach can undesirably increase the cost of the switching device.

SUMMARY OF THE INVENTION

Switching device with reduced intermodulation distortion, substantially as shown in and/or described in connection with at least one of the figures, as set forth more completely in the claims.

DETAILED DESCRIPTION OF THE INVENTION

The present invention is directed to a switching device with reduced intermodulation distortion. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art.

The drawings in the present application and their accompanying detailed description are directed to merely exemplary embodiments of the invention. To maintain brevity, other embodiments of the invention which use the principles of the present invention are not specifically described in the present application and are not specifically illustrated by the present drawings.

Figure 1:
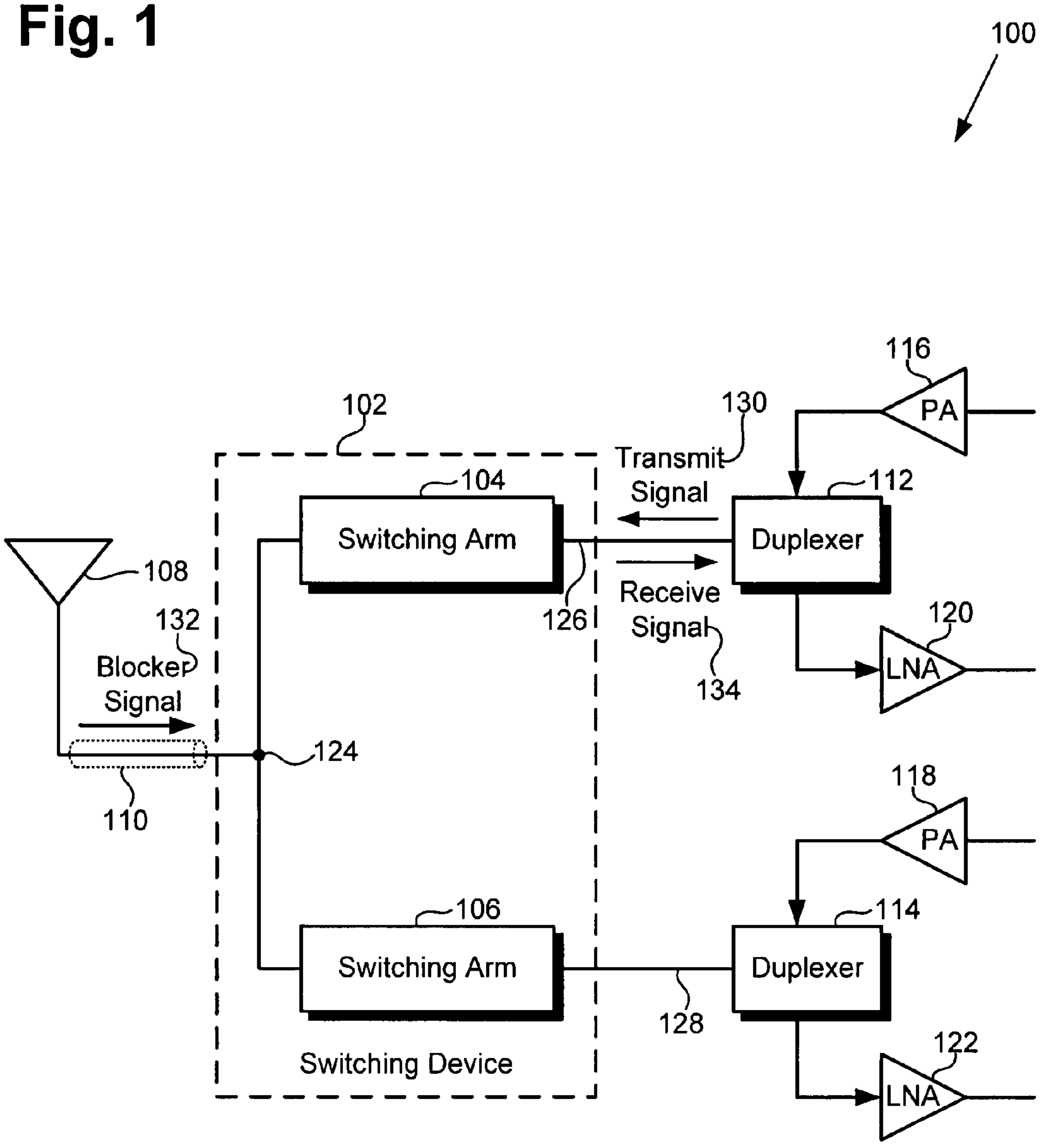
FIG. 1 illustrates a diagram of an exemplary communication system including an exemplary switching device in accordance with one embodiment of the present invention.

FIG. 1 shows a block diagram of communication system 100 in accordance with one embodiment of the present invention. Certain details and features have been left out of FIG. 1, which are apparent to a person of ordinary skill in the art. Communication system 100 includes switching device 102, which includes switching arms 104 and 106, antenna 108, transmission line 110, duplexers 112 and 114, power amplifiers 116 and 118, and low noise amplifiers (LNAs) 120 and 122. Communication system 100 can be, for example, a wireless communication system and can utilize GSM, Wideband Code Division Multiple Access (W-CDMA), or other suitable communications standards. Switching device 102 can be a high frequency switching device, such as an RF switching device, and can be configured to coupled duplexer 112 to antenna 108 when switching arm 104 is selected or to couple duplexer 114 to antenna 108 when switching arm 106 is selected. In other embodiments, switching device 102 can include more than two switching arms.

As shown in FIG. 1, antenna 108 is coupled by transmission line 110 to the outputs of switching arms 104 and 106 at node 124, which forms a shared output of switching device 102. Also shown in FIG. 1, the input of switching arm 104 is coupled to the antenna port of duplexer 112 via line 126, the transmit port of duplexer 112 is coupled to the output of power amplifier 116, and the receive port of duplexer 112 is coupled to the input of LNA 120. Further shown in FIG. 1, the input of switching arm 106 is coupled to the antenna port of duplexer 114 via line 128, the transmit port of duplexer 114 is coupled to the output of power amplifier 118, and the receive port of duplexer 114 is coupled to the input of LNA 122. Power amplifiers 116 and 118 can each provide an RF signal having a different frequency for operation in a particular communication band. For example, power amplifier 116 can provide a 900.0 MHz signal for operation in a GSM low band and power amplifier 118 can provide an 1800.0 MHz signal for operation in a GSM high band.

During operation of communication system 100, either switching arm 104 of switching device 102 is selected, i.e., enabled, and switching arm 106 is disabled, or vice versa. When switching arm 104 is enabled and switching arm 106 is disabled, transmit signal 130, which is outputted by power amplifier 116, is coupled from an input of switching device 102 to antenna 108 via switching arm 104. The IMD (intermodulation distortion) performance, such as third-order intermodulation distortion (IMD3) performance, of switching device 102 can be adversely affected by an out-of-band blocker signal, such as out-of-band blocker signal 132 (also referred to simply as blocker signal 132). Blocker signal 132, which can be coupled from antenna 108 to the output of switching device 102 via transmission line 110, can be combined with transmit signal 130 in switching arm 104 and form an IMD3 product. If the IMD3 product is in the receive frequency band of LNA 120, the IMD3 product can interfere with receive signal 134, which is coupled from antenna 108 to LNA 120 via switching arm 104 and duplexer 112.

The IMD3 product produced by a switching device, such as switching device 102, can be affected by a phase shift that can occur between an antenna, such as antenna 108, and the switching device. For example, the IMD3 product may be reduced for some degrees of phase shift between the antenna and the switching device, such as 45.0 degrees, 105.0 degrees, and 180.0 degrees, while the IMD3 product may be increased for other degrees of phase shift, such as 0.0 degrees, 75.0 degrees, and 150.0 degrees. However, in a particular application, such as communication system 100, the phase shift between the antenna, such as antenna 108, and the switching device, such as switching device 102, is fixed by, for example, the impedance of the transmission line coupling the antenna to the switching device, such as transmission line 110.

In an embodiment of the present invention, switching device 102 can operate in one of at least two selectable phase shifting modes. When a first phase shifting mode is selected, for example, a first phase shifting switching branch (not shown in FIG. 1) of a selected switching arm can be enabled and a second phase shifting switching branch (not shown in FIG. 1) of the selected switching arm can be disabled. When a second phase shifting mode is selected, for example, the first phase shifting switching branch of the selected switching arm can be disabled and the second phase shifting switching branch can be disabled. The first phase shifting switching branch of the selected switching arm in switching device 102 can comprise a phase shifter (not shown in FIG. 1), which can shift the phase of the switching device by a predetermined amount, such as, for example, 45.0 degrees. The second phase shifting switching branch of the selected switching arm can comprise a number of series-coupled FETs that provide approximately 0.0 degrees of phase shift. In other words, the series-coupled FETs in the second phase shifting switching branch do not significantly shift or alter the phase of the switching device.

In the present embodiment, IMD3 can be reduced by selecting the particular phase shifting mode of the selected switching arm that provides the greatest amount of attenuation of an out-of-band blocking signal, such as blocker signal 132. For example, if the first phase shifting switching branch of the selected switching arm provides greater attenuation of the blocker signal than the second phase shifting switching branch, the first phase shifting mode can be selected, and vice versa. Thus, an embodiment of the invention's switching device 102 can be advantageously tuned for reduced IMD3, i.e., increased IMD3 performance, by appropriately selecting one of at least two phase shifting modes so as to enable a corresponding phase shifting switching branch in a selected switching arm of the switching device. Embodiments of the invention's switching device are further discussed below in relation to FIGS. 2 and 4.

Figure 2:
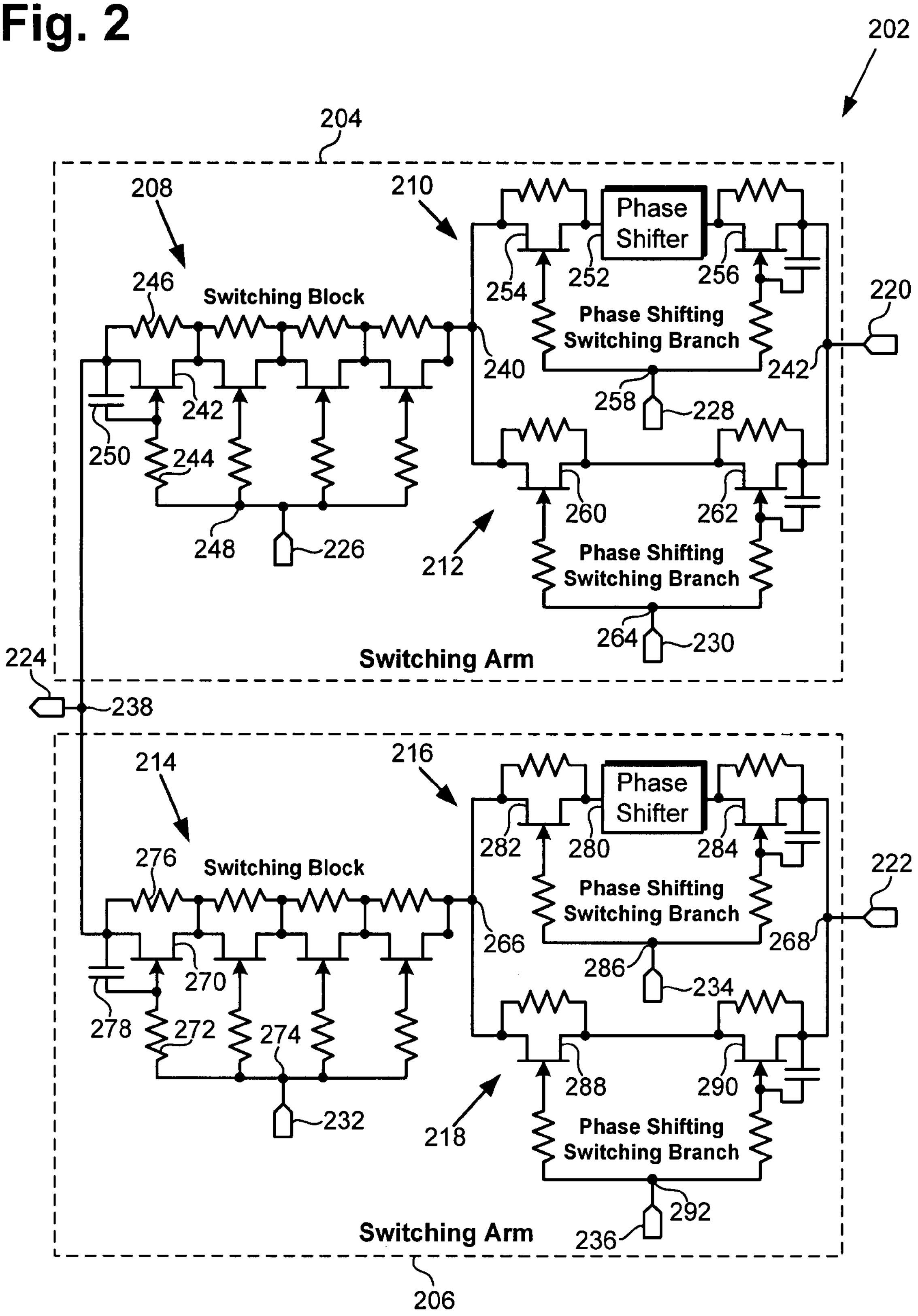
FIG. 2 illustrates a diagram of an exemplary switching device in accordance with one embodiment of the present invention.

FIG. 2 shows a schematic diagram of switching device 202 in accordance with one embodiment of the present invention. In FIG. 2, switching device 202 and switching arms 204 and 206 correspond, respectively, to switching device 102 and switching arms 104 and 106 in communication system 100 in FIG. 1. Switching device 202 includes switching arm 204, which includes switching block 208 and phase shifting switching branches 210 and 212, and switching arm 206, which includes switching block 214 and phase shifting switching branches 216 and 218. Switching device 202 also includes signal inputs 220 and 222 and signal output 224 (which is also referred to as a "shared output" in the present application and corresponds to shared output node 124 in FIG. 1), and control voltage inputs 226, 228, 230, 232, 234, and 236. Switching device 202 can be fabricated on a single semiconductor die.

As shown in FIG. 2, switching arms 204 and 206 are coupled between signal output 224 and respective signal inputs 220 and 222 of switching device 202. In switching arm 204, a first terminal of switching block 208 is coupled to signal output 224 at node 238, a second terminal of switching block 208 is coupled to first terminals of phase shifting switching branches 210 and 212 at node 240, and second terminals of phase shifting switching branches 210 and 212 are coupled to signal input 220 at node 242. Thus, phase shifting switching branches 210 and 212 are coupled in parallel between nodes 240 and 242.

Also shown in FIG. 2, switching block 208 includes a number of FETs, such as FET 242, which are coupled together in series between nodes 238 and 240. Each FET in switching block 208 can be, for example, an NFET. In the present embodiment, switching block 208 can comprise four FETs. In other embodiments, switching block 208 can comprise two or more series-coupled FETs. In switching block 208, a resistor, such as resistor 244, couples the gate of each FET to control voltage input 226 at node 248 and a resistor, such as resistor 246, is coupled between drain and source of each FET. Switching block 208 also includes capacitor 250, which is coupled between drain and gate of FET 242.

Further shown in FIG. 2, phase shifting switching branch 210 includes phase shifter 252, which has an output terminal coupled to the source of FET 254 and an output terminal coupled to the drain of FET 256. In phase shifting switching branch 210, a resistor, such as resistor 244, couples the gate of each of FETs 254 and 256 to control voltage input 228 at node 258 and a resistor, such as resistor 246, is coupled between drain and source of each of FETs 254 and 256. Phase shifter 252 can be, for example, an LC circuit, which can be a low pass filter, such as a Pi-type or T-type low pass filter. The LC circuit can include an arrangement of inductors and capacitors having values that are selected so as to provide a desired degree of phase shift, such as a 45.0 degree phase shift. In other embodiments, phase shifter 252 can comprise a single phase shifting component, such as an inductor or a capacitor. Phase shifting switching branch 210 also includes a capacitor, such as capacitor 250, which is coupled between the gate and source of FET 256. FETs 254 and 256 can each be, for example, an NFET. In other embodiments, phase shifting switching branch 210 can include two or more series-coupled FETs further coupled to the input and/or output terminals of phase shifter 252.

Also shown in FIG. 2, phase shifting switching branch 212 includes FETs 260 and 262, which are coupled in series between nodes 240 and 242. In phase shifting switching branch 212, a resistor, such as resistor 244, couples the gate of each of FETs 260 and 262 to control voltage input 230 at node 264 and a resistor, such as resistor 246, is coupled between drain and source of each of FETs 260 and 262. Phase shifting switching branch 212 also includes a capacitor, such as capacitor 250, which is coupled between the gate and source of FET 262. FETs 260 and 262 can each be, for example, an NFET. In the present embodiment, phase shifting switching branch 212 can comprise two series-coupled FETs. In one embodiment, phase shifting switching branch 212 can comprise more than two series-coupled FETs.

Further shown in FIG. 2, in switching arm 206, a first terminal of switching block 214 is coupled to signal output 224 at node 238, a second terminal of switching block 214 is coupled to first terminals of phase shifting switching branches 216 and 218 at node 266, and second terminals of phase shifting switching branches 216 and 218 are coupled to signal input 222 at node 268. Also shown in FIG. 2, switching block 214 includes a number of FETs, such as FET 270, which are coupled together in series between nodes 238 and 266. Each FET in switching block 214 can be, for example, an NFET. In the present embodiment, switching block 214 can comprise four FETs. In other embodiments, switching block 214 can comprise two or more series-coupled FETs. In switching block 214, a resistor, such as resistor 272, couples the gate of each FET to control voltage input 232 at node 274 and a resistor, such as resistor 276, is coupled between drain and source of each FET. Switching block 214 also includes capacitor 278, which is coupled between drain and gate of FET 270.

Further shown in FIG. 2, phase shifting switching branch 216 includes phase shifter 280, which has an output terminal coupled to the source of FET 282 and an output terminal coupled to the drain of FET 284. In phase shifting branch 216, a resistor, such as resistor 272, couples the gate of each of FETs 282 and 284 to control voltage input 234 at node 286 and a resistor, such as resistor 276, is coupled between drain and source of each of FETs 282 and 284. Phase shifter 280 can be, for example, an LC circuit, which can be a low pass filter, such as a Pi-type or T-type low pass filter. The LC circuit can include an arrangement of inductors and capacitors having values that are selected so as to provide a desired degree of phase shift, such as a 45.0 degree phase shift. In other embodiments, phase shifter 280 can comprise a phase shifting component, such as an inductor or a capacitor.

In the present embodiment, phase shifter 280 can provide the same degree of phase shift as phase shifter 252 in phase shifting switching branch 210. In another embodiment, phase shifter 280 may provide a different degree of phase shift compared to phase shifter 252. Phase shifting switching branch 216 also includes a capacitor, such as capacitor 278, which is coupled between the gate and source of FET 284. FETs 282 and 284 can each be, for example, an NFET. In other embodiments, phase shifting switching branch 216 can include two or more series-coupled FETs further coupled to the input and/or output terminals of phase shifter 280.

Also shown in FIG. 2, phase shifting switching branch 218 includes FETs 288 and 290, which are coupled in series between nodes 266 and 268. In phase shifting switching branch 218, a resistor, such as resistor 272, couples the gate of each of FETs 288 and 290 to control voltage input 236 at node 292 and a resistor, such as resistor 276, is coupled between drain and source of each of FETs 288 and 290. Phase shifting switching branch 218 also includes a capacitor, such as capacitor 278, which is coupled between the gate and source of FET 290. FETs 288 and 290 can each be, for example, an NFET. In the present embodiment, Phase shifting switching branch 218 can comprise two series-coupled FETs. In one embodiment, phase shifting switching branch 218 can comprise more than two series-coupled FETs.

In switching arm 204, control voltage inputs 226, 228, and 230 can each receive a high control voltage (VH) to select, i.e., enable, or a low control voltage (VL) to disable respective switching block 208 and phase shifting switching branches 210 and 212. Similarly, in switching arm 206, control voltage inputs 232, 234, and 236 can each receive VH to select or VL to disable respective switching block 214 and phase shifting switching branches 216 and 218. VH can be, for example, between approximately 3.0 volts and approximately 7.0 volts and VL can be, for example, approximately 0.0 volts. Control voltage inputs 228, 230, 234, and 236 are examples of, and are also referred to as, "phase selection terminals" in the present application.

The operation of switching device 202 will now be discussed with reference to communication system 100 in FIG. 1, where antenna 108 is coupled by transmission line 110 to signal output 224 of switching device 202 and transmit signal 130 from power amplifier 116 is coupled via duplexer 112 to signal input 220 of switching device 202. For the following discussion, switching device 202 is in an operating state in which switching arm 204 is selected, i.e., enabled, and switching arm 206 is deselected, i.e., disabled. However, the following discussion can also be applied to an operating state of switching device 202 in which switching arm 206 is selected and switching arm 204 is disabled.

Switching arm 204 can be selected by applying VH, i.e., a high control voltage, to control voltage input 226 to enable switching block 208 and by selecting one of two phase shifting modes. For example, a first phase shifting mode can be selected by applying VH to a first phase selection terminal, i.e., control voltage input 228, to enable phase shifting switching branch 210 and by applying VL, i.e., a low control voltage, to a second phase selection terminal, i.e., control voltage input 230, to disable phase shifting switching branch 212. For example, the second phase shifting mode can be selected by applying VL to the first phase selection terminal to disable phase shifting switching branch 210 and by applying VH to the second phase selection terminal to enable phase shifting switching branch 212.

As discussed above, the IMD3 (third-order intermodulation distortion) produced by switching device 202 as a result of the interaction between an out-of-band blocker signal, e.g., blocker signal 132 in FIG. 1, which is coupled to signal output 224 from antenna 108, and transmit signal 130, which is coupled to signal input 220, is affected by the phase shift between antenna 108 and signal input 220. For example, a phase shift of 45.0 degrees between antenna 108 and signal input 220 might result in a lower level of IMD3 while a phase shift of 75.0 degrees might result in a higher level of IMD3. In the present embodiment, switching device 202 can be tuned by selecting whichever phase shifting mode results in a greater attenuation of blocker signal 132 and, thereby, providing a lower level of IMD3. In the first phase shifting mode, phase shifting switching branch 210 is enabled, thereby causing a pre-determined amount of phase shift provided by phase shifter 252 to be added to the existing amount of phase shift between antenna 108 and signal input 220. In the second phase shifting mode, phase shifting switching branch 212 is enabled, thereby adding substantially 0.0 degrees of phase shift to the existing phase shift between antenna 108 and signal input 220.

When switching arm 204 is selected, switching arm 206 can be disabled by applying VL to control voltage inputs 232, 234, and 236 to disable respective switching block 214 and phase shifting switching branches 216 and 218. When switching arm 204 is selected, signal input 220 is coupled to signal output 224 such that an RF signal, e.g., transmit signal 130, at signal input 220 is allowed to pass through either phase shifting switching branch 210 or phase shifting switching branch 212 (depending on which phase shifting mode is selected) and switching block 208 to signal output 224. The RF signal at signal output 224 provides a peak RF voltage (Vrf) at node 238, which is equally divided between gate/drain and gate/source junctions of each FET in switching block 214. Switching block 214 (or switching block 208 when switching arm 206 is selected) requires a sufficient number of series-coupled FETs to prevent the voltage at the gate/drain and gate/source junctions of the FETs in the switching block from causing the FET bias voltage to approach the pinch-off voltage and, thereby, increasing harmonic generation and decreasing IMD performance.

A conventional switching device can include two switching arms, where each switching arm can include a number of series-coupled FETs. In one approach, IMD3 can be reduced in the conventional switching device by increasing the number of FETs in each switching arm. However, this approach can undesirably increase die size and increase signal loss in the switching device. In another approach, a charge pump can be utilized to increase the control voltage that is utilized to enable the selected switching arm, which can decrease IMD3 by preventing the bias voltage on the FETs in the disabled switching arm from reaching the pinch-off voltage. However, the charge pump can increase cost and die size and can require complicated technology for implementation.

By providing selectable phase shifting modes to tune a switching device for reduced IMD3, the invention's switching device advantageously achieves increased IMD3 performance while avoiding the undesirable effects, such as increased cost, die size, and signal loss and implementation complications, that can result from utilizing conventional approaches for reducing IMD3 in a conventional switching device.

Figure 3A:
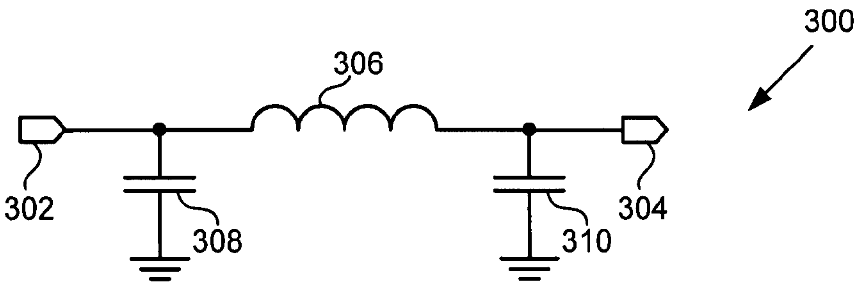
FIG. 3A illustrates a diagram of an exemplary LC circuit for an exemplary switching device in accordance with one embodiment of the present invention.

FIG. 3A shows a schematic diagram of LC circuit 300 in accordance with one embodiment of the present invention. LC circuit 300 illustrates an implementation of a phase shifter, such as phase shifters 252 and 280, utilized in a phase shifting switching branch of an embodiment of the invention's switching device, such as switching device 202 in FIG. 2. LC circuit 300 is a Pi-type low pass filter having input terminal 302 and output terminal 304 and including inductor 306 and capacitors 308 and 310, where inductor 306 is coupled between capacitors 308 and 310 in a Pi-type configuration. The values of inductor 306 and capacitors 308 and 310 can be selected to provide a desired phase shift in an embodiment of the invention's switching device.

Figure 3B:
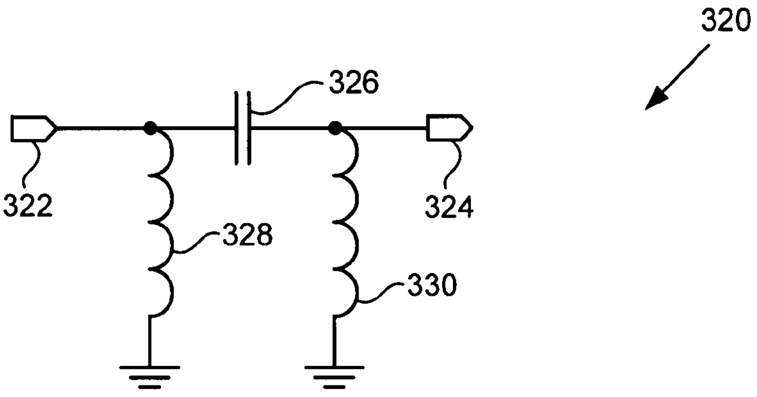
FIG. 3B illustrates a diagram of an exemplary LC circuit for an exemplary switching device in accordance with one embodiment of the present invention.

FIG. 3B shows a schematic diagram of LC circuit 320 in accordance with one embodiment of the present invention. LC circuit 320 illustrates an implementation of a phase shifter, such as phase shifters 252 and 280, utilized in a phase shifting switching branch of an embodiment of the invention's switching device, such as switching device 202 in FIG. 2. LC circuit 320 is a Pi-type low pass filter having input terminal 322 and output terminal 324 and including capacitor 326 and inductors 328 and 330, where capacitor 326 is coupled between inductors 328 and 330 in a Pi-type configuration. The values of capacitor 326 and inductors 328 and 330 can be selected to provide a desired phase shift in an embodiment of the invention's switching device.

Figure 3C:
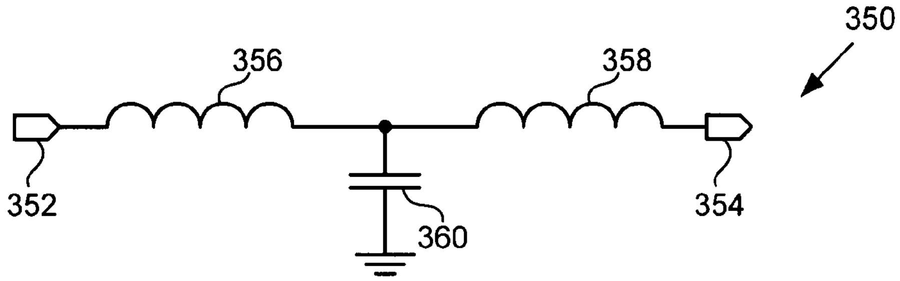
FIG. 3C illustrates a diagram of an exemplary LC circuit for an exemplary switching device in accordance with one embodiment of the present invention.

FIG. 3C shows a schematic diagram of LC circuit 350 in accordance with one embodiment of the present invention. LC circuit 350 illustrates an implementation of a phase shifter, such as phase shifters 252 and 280, utilized in a phase shifting switching branch of an embodiment of the invention's switching device, such as switching device 202 in FIG. 2. LC circuit 350 is a T-type low pass filter having input terminal 352 and output terminal 354 and including capacitor 360 and inductors 356 and 358, where capacitor 360 is coupled between inductors 356 and 358 in a T-type configuration. The values of capacitor 360 and inductors 356 and 358 can be selected to provide a desired phase shift in an embodiment of the invention's switching device.

Figure 3D:
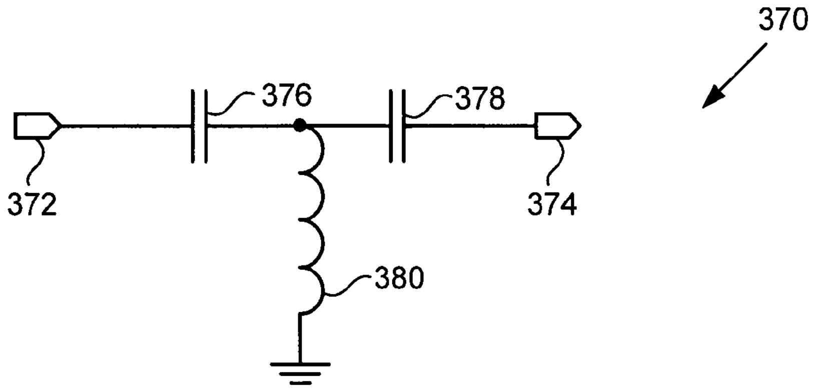
FIG. 3D illustrates a diagram of an exemplary LC circuit for an exemplary switching device in accordance with one embodiment of the present invention.

FIG. 3D shows a schematic diagram of LC circuit 370 in accordance with one embodiment of the present invention. LC circuit 370 illustrates an implementation of a phase shifter, such as phase shifters 252 and 280, utilized in a phase shifting switching branch of an embodiment of the invention's switching device, such as switching device 202 in FIG. 2. LC circuit 370 is a T-type low pass filter having input terminal 372 and output terminal 374 and including capacitors 376 and 378 and inductor 380, where inductor 380 is coupled between capacitors 376 and 378 in a T-type configuration. The values of capacitors 376 and 378 and inductor 380 can be selected to provide a desired phase shift in an embodiment of the invention's switching device.

Figure 4:
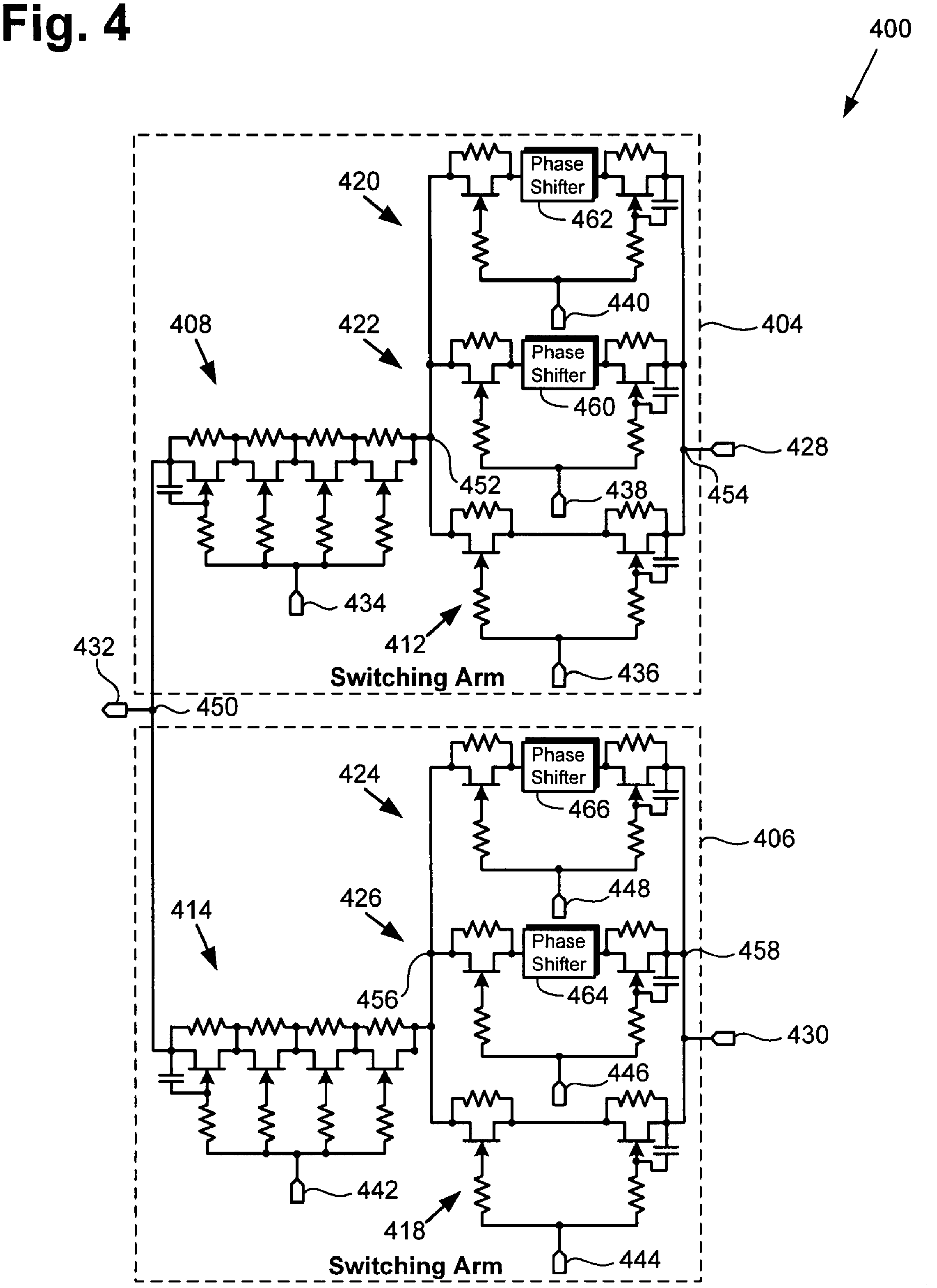
FIG. 4 illustrates a diagram of an exemplary switching device in accordance with another embodiment of the present invention.

FIG. 4 shows a schematic diagram of switching device 400 in accordance with one embodiment of the present invention. In FIG. 4, switching blocks 408 and 414 and non-phase shifting branches 412 and 418 in switching device 400 correspond, respectively, to switching blocks 208 and 214 and non-phase shifting branches 212 and 218 in switching device 202 in FIG. 2. Also, except for the amount of phase shift that each phase shifting switching branch provides, phase shifting switching branches 420 and 422 in switching device 400 each correspond to phase shifting switching branch 210 in switching device 202 and phase shifting switching branches 424 and 426 in switching device 400 each correspond to phase shifting switching branch 216 in switching device 202. Switching device 400 can be utilized in a communication system, such as communication system 100 in FIG. 1, to selective couple two or more duplexers, such as duplexers 112 and 114, to an antenna, such as antenna 108. Switching device 400 can also be utilized in other applications that require a high frequency switching device with reduced IMD3.

Switching device 400 includes switching arm 404, which includes switching block 408, phase shifting switching branches 412, 420, and 422, and switching arm 406, which includes switching block 414 and phase shifting switching branches 418, 424, and 426. Switching device 400 also includes signal inputs 428 and 430, and signal output 432, which is also referred to as a "shared output" in the present application, and control voltage inputs 434, 436, 438, 440, 442, 444, 446, and 448. Control voltage inputs 436, 438, 440, 444, 446, and 448 are also referred to as "phase selection terminals" in the present application. Switching device 400 can be fabricated on a single semiconductor die.

As shown in FIG. 4, switching arms 404 and 406 are coupled between signal output 432 and respective signal inputs 428 and 430 of switching device 400. In switching arm 404, switching block 408 is coupled between nodes 450 and 452 and phase shifting switching branches 412, 420, and 422 are coupled in parallel between node 452 and signal input 428 at node 454. Phase shifting switching branches 420 and 422 includes respective phase shifters 462 and 460, which can provide different degrees of phase shift. In switching arm 406, switching block 414 is coupled between nodes 450 and 456 and phase shifting switching branches 418, 424, and 426 are coupled in parallel between node 456 and signal input 430 at node 458. Phase shifting switching branches 424 and 426 includes respective phase shifters 466 and 464, which can provide different degrees of phase shift. Phase shifters 460, 462, 464, and 466 can each comprise, for example, an LC circuit, such as LC circuits 300, 320, 350, or 370 in respective FIGS. 3A, 3B, 3C, and 3D. In other embodiments, phase shifters 460, 462, 464, and 466 can each comprise a phase shifting component, such as an inductor or capacitor.

In contrast to switching device 202, switching device 400 includes an additional phase shifting switching branch in each switching arm. Thus, during operation, an additional phase shifting mode can be selected in switching device 400 compared to switching device 202 to reduced IMD in the switching device. In switching device 400, switching arm 404 can be selected by applying VH, i.e., a high control voltage, to control voltage input 434 to enable switching block 408 and by selecting one of three phase shifting modes. For example, a first phase shifting mode can be selected by applying VH to a first phase selection terminal, i.e., control voltage input 436, to enable phase shifting switching branch 412, a second phase shifting mode can be selected by applying VH to a second phase selection terminal, i.e., control voltage input 438, to enable phase shifting switching branch 422, or a third phase shifting mode can be selected by applying VH to a third phase selection terminal, i.e., control voltage input 440, to enable phase shifting switching branch 420. When a particular phase shifting mode is selected, the unselected phase shifting switching branches can be disabled by applying VL to the respective phase selection terminals of the unselected phase shifting switching branches.

The first phase shifting mode can provide an approximate 0.0 degree phase shift, the second phase shifting mode can provide a phase shift that is determined by phase shifter 460 in phase shifting switching branch 422, and the third phase shifting mode can provide a phase shift that is determined by phase shifter 462 in phase shifting switching branch 420. By utilizing an additional phase shifting switching branch with an additional phase shifter, switching device 400 can provide a smaller phase adjustment step compared to switching device 202 in FIG. 2. As a result, the phase of switching device 400 can be more finely tuned to achieve reduced IMD, such as IMD3. Switching device 400 also provides similar advantages as discussed above in relation to switching device 200. In other embodiments, the invention's switching device may include more than three phase shifting modes.

Thus, as discussed above in the embodiments in FIGS. 1, 2, and 4, the invention provides a switching device, such as a high frequency switching device, having selectable switching arms with multiple selectable phase shifting modes. By appropriately selecting one of the phase shifting modes in a selected switching arm, the phase of the invention's switching device can be tuned to advantageously reduce IMD3 in the switching device.

From the above description of the invention it is manifest that various techniques can be used for implementing the concepts of the present invention without departing from its scope. Moreover, while the invention has been described with specific reference to certain embodiments, a person of ordinary skill in the art would appreciate that changes can be made in form and detail without departing from the spirit and the scope of the invention. Thus, the described embodiments are to be considered in all respects as illustrative and not restrictive. It should also be understood that the invention is not limited to the particular embodiments described herein but is capable of many rearrangements, modifications, and substitutions without departing from the scope of the invention.

Thus, a switching device with reduced intermodulation distortion has been described.

The invention claimed is:

1. A switching device with phase selection terminals to select between at least two phase shifting modes to reduce intermodulation distortion in said switching device, said switching device comprising:

a first phase selection terminal to select a first phase shifting mode of said switching device by enabling a first phase shifter in a first phase shifting switching branch;

a second phase selection terminal to select a second phase shifting mode of said switching device by enabling a second phase shifting switching branch;

wherein said intermodulation distortion is reduced by selecting one of said first and second phase shifting modes.

2. The switching device of claim 1 further comprising a plurality of FETs coupled in series between an output of said switching device and said first and second phase shifting switching branches.

3. The switching device of claim 1, wherein said first phase shifter is coupled between two FETs in said first phase shifting switching branch.

4. The switching device of claim 1, wherein said first phase shifter comprises an LC circuit.

5. The switching device of claim 1, wherein said second phase shifting switching branch comprises at least two series-coupled FETs.

6. The switching device of claim 1, wherein an input of said switching device is coupled to a duplexer.

7. The switching device of claim 1, wherein an output of said switching device is coupled to an antenna.

8. A switching device with reduced intermodulation distortion, said switching device comprising:

a first switching arm coupled to a first input and a shared output of said switching device;

said first switching arm comprising a plurality of phase shifting switching branches coupled in parallel, a first of said plurality of phase shifting switching branches comprising a first phase shifter;

wherein one of said plurality of phase shifting switching branches is selected to reduce said intermodulation distortion of said switching device.

9. The switching device of claim 8, wherein said first switching arm further comprises a plurality of FETs coupled in series between said shared output and said plurality of phase shifting switching branches.

10. The switching device of claim 8, wherein said first phase shifter is coupled between two FETs in said first phase shifting switching branch.

11. The switching device of claim 8, wherein a second of said plurality of phase shifting branches comprises a plurality of FETs coupled in series.

12. The switching device of claim 8, wherein said first phase shifter comprises an LC circuit.

13. The switching device of claim 8, wherein said first phase shifter is selected from the group consisting of a capacitor and an inductor.

14. The switching device of claim 8, wherein a second of said plurality of phase shifting switching arms comprises a second phase shifter.

15. The switching device of claim 8 further comprising a second switching arm coupled to a second input and said shared output of said switching device.

16. The switching device of claim 8, wherein said shared output is coupled to an antenna.

17. A communication system comprising:

a switching device coupled between an antenna and at least one duplexer, said switching device comprising:

a first switching arm coupled to a first input and a shared output of said switching device;

said first switching arm comprising a plurality of phase shifting switching branches coupled in parallel, a first of said plurality of phase shifting switching branches comprising a first phase shifter;

wherein one of said plurality of phase shifting switching branches is selected to reduce intermodulation distortion of said switching device.

18. The communication system of claim 17, wherein said communication system utilizes a communications standard selected from the group consisting of GSM and W-CDMA.

19. The communication system of claim 17, wherein said first phase shifter is coupled between two FETs in said first phase shifting switching branch.

20. The communication system of claim 17, wherein said first phase shifter comprises an LC circuit.

* * * * *